United States Patent Office 3,421,143
Patented Jan. 7, 1969

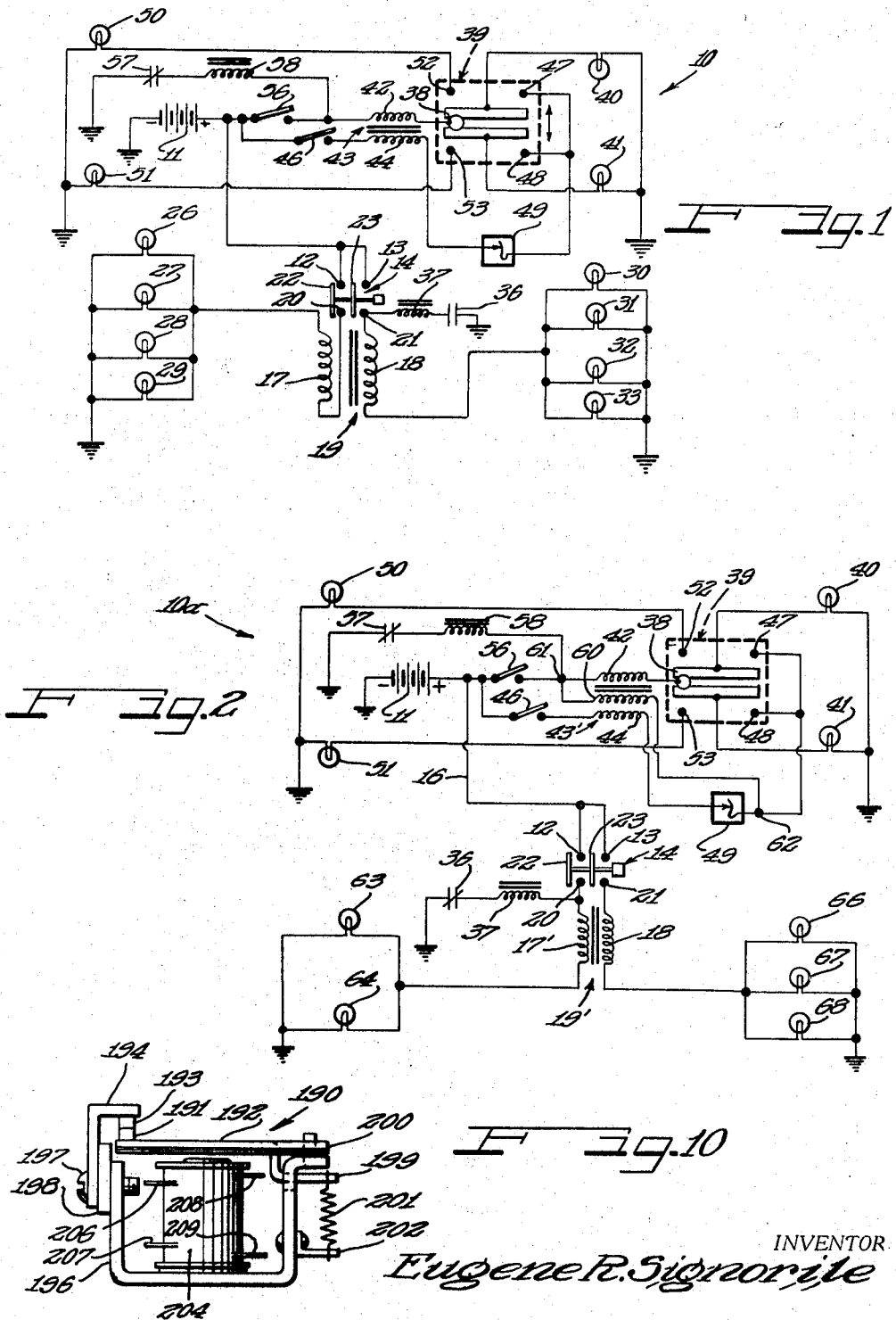

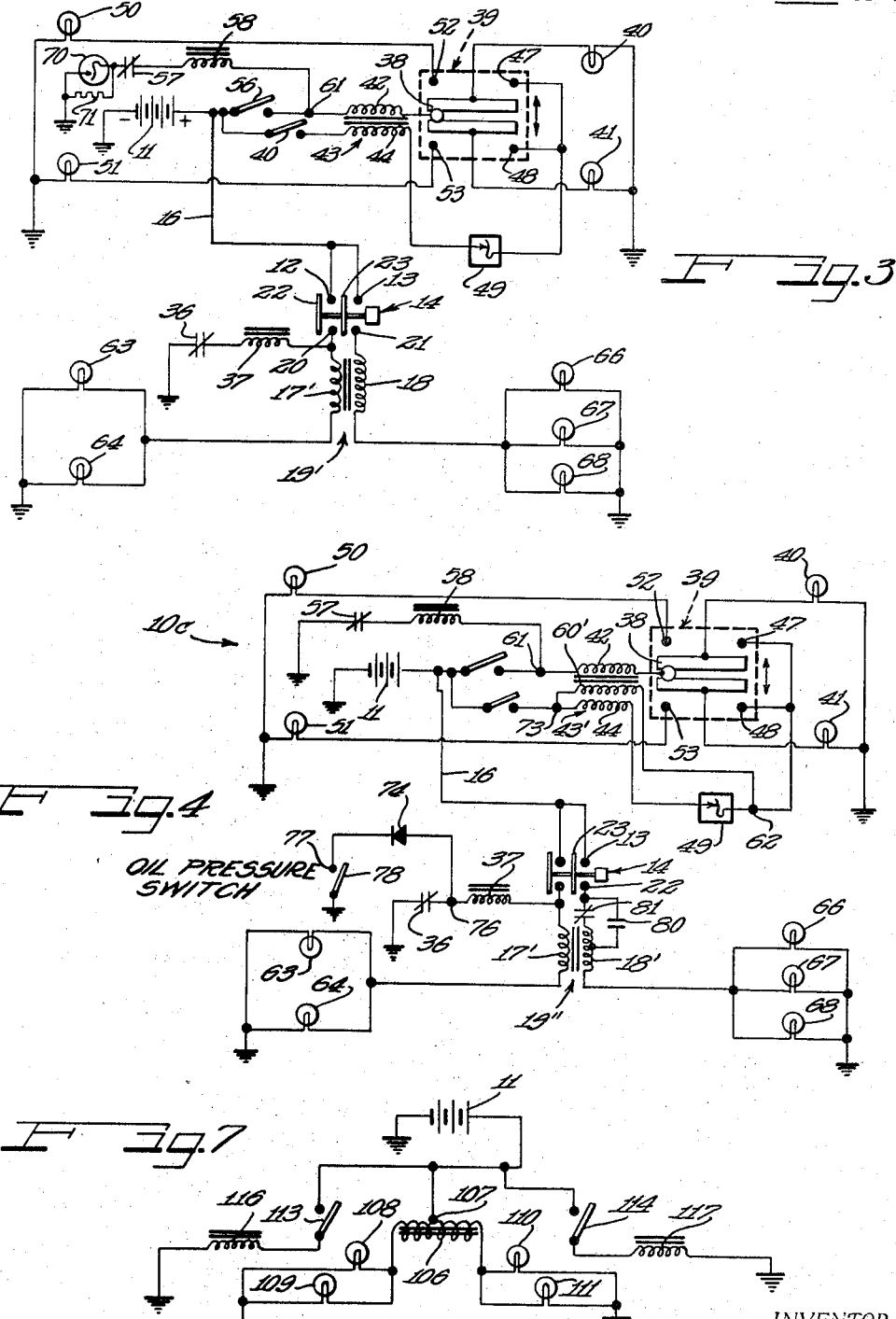

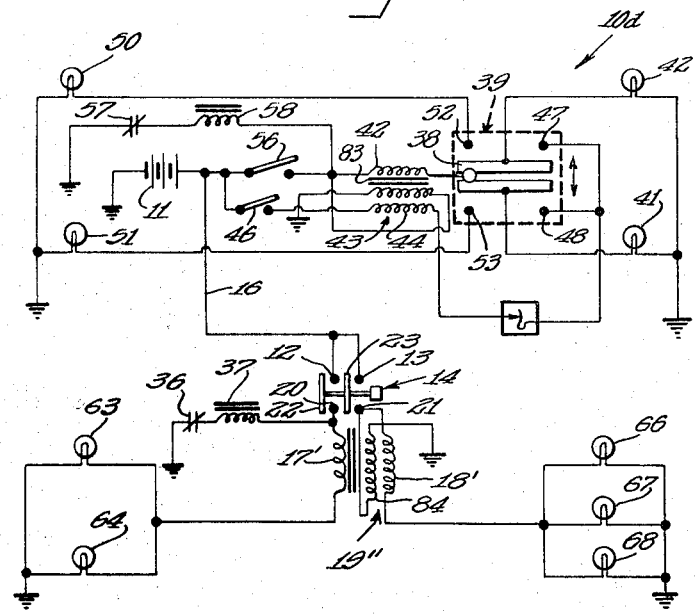

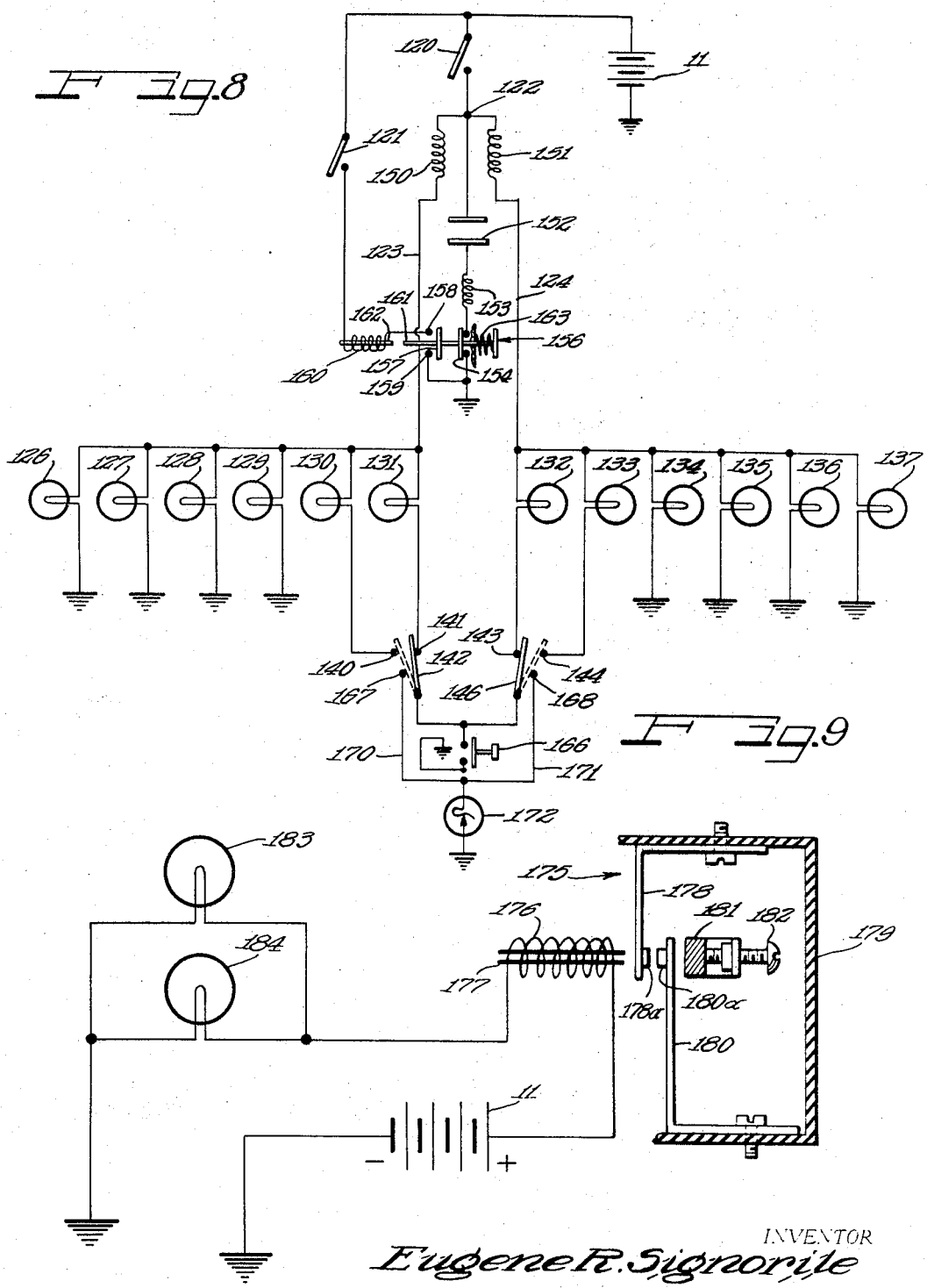

3,421,143
VEHICLE LAMP ELECTRICAL WARNING DEVICE
Eugene R. Signorile, Chicago, Ill., assignor to Accurate Electronics Co., Chicago, Ill., a corporation of Illinois
Filed Oct. 24, 1965, Ser. No. 504,532
U.S. Cl. 340—75          10 Claims
Int. Cl. B60q 1/26; G08b 21/00; H01h 47/00

ABSTRACT OF THE DISCLOSURE

A warning system for an automobile to indicate when one of several of the lamps of the automobile is inoperative. Current sensing means are connected between the power source and various groups of the lamps of the automobile to sense current flow from the power source to the lamps. A switch is positioned in proximity to the sensing means to be actuated by the sensing means in response to current flow differences through the sensing means. The switch actuates a warning device such as a buzzer.

---

This invention relates generally to a warning system which may be used on motor vehicles to provide a warning signal to the operator indicating that one or more of the vehicle electrical power utilization devices has failed. Specifically, the invention is a warning system which has means for sensing the current flow delivered to lamps of a motor vehicle and which will provide a warning signal should one or more of the lamps fail. One specific form of the novel warning system includes an electromagnetic armature or relay which is provided with a pair of coils to develop a magnetic field as electric current passes therethrough to actuate suitable switch means.

The present invention is particularly useful in conjunction with an automobile. The manufacturers of automobiles are continuously searching for ways to make automobiles safer. One very common, but often overlooked, safety feature of an automobile is the provision of brake lights on the rear of the automobile to indicate to persons driving behind that the automobile in front of them is stopping.

Also, the tail lights and head lights on an automobile are obvious safety features which are often overlooked as such. Furthermore, the turn signal indicator on automobiles is another safety feature which is often overlooked by the operator as being a safety feature.

These and other safety features which automobile manufacturers design into an automobile are, in the most part, not regarded as safety features by the automobile owner or operator. Therefore, when one or more of these lights fail to operate properly they may not be replaced or repaired. One reason for the apparent disregard of the operability of the safety devices, such as lights, on an automobile, is that the operator is inside the automobile while the lights are outside. Therefore, the operator cannot readily see the lights on his own vehicle.

It is therefore one of the primary objects of this invention to provide signalling means inside the automobile to indicate to the operator thereof that one or more of the lights on the automobile are not operating properly.

Another object of the present invention is to provide a warning system which will produce an audible signal when one or more of the lights on a motor vehicle are not operating properly.

Another object of the present invention is to provide a warning system wherein the operability of all of the lights on a motor vehicle is incorporated into the warning system having a minimum of parts, and is inexpensive and easy to manufacture.

Another object of the present invention is to provide a warning system for use on an automobile which is easy to install into the wiring system of present automobiles.

A further object of the present invention is to provide a warning system which can be easily integrated into the wiring scheme of new automobiles being manufactured.

Still another object of the present invention is to provide a warning device which senses current flow through the lamps of an automobile, and when the current flow therethrough changes, a warning signal will be initiated.

A feature of the present invention is an elecromagnetic actuating device which is operated by current delivered to the lamps of an automobile.

Still another feature of the present invention is an automatically resettable switch which is actuated to disable the warning signal when the automobile is operated during a first instance, but will automatically reset to again warn the operator of an improperly operating light each time the automobile is operated.

Briefly, the present invention, as used on automobiles, provides a unique warning system. An electromagnetic switching device is used to sense the current flow delivered to the lamps of the motor vehicle. Furthermore, an automatically resettable cut-out switch is incorporated in the warning system. The cut-out switch is used to disable the warning signal during the operation of the motor vehicle. However, if the defective lamp of the motor vehicle has not been replaced or repaired, the warning signal will be activated each time the automobile is operated.

The warning system illustrated by the present invention provides an audible signal to indicate the following: when the headlights are burned out, when the taillights are burned out, when the license plate light is burned out, when the lights are left on after the ignition switch has been turned off, when the brake lights are burned out, when the emergency brake is left on after the ignition switch is turned on, when the oil pressure is low, when there is faulty or defective wiring in the lighting system, and when the brake light switch is defective.

The warning system of the present invention is further provided with means for stabilizing the operation thereof so that in-rush current and voltage variations do not give erroneous indications.

This invention, however, will be more fully realized and understood from the following detailed description when taken in conjunction with the accompanying drawings in which:

FIGURE 1 is a schematic wiring diagram of the warning system when used in conjunction with an automobile;
FIGURE 2 is a modified form of the system of FIGURE 1;
FIGURE 3 is still another modified form of the system of FIGURE 1;
FIGURE 4 is a further modified form of the system of FIGURE 1;
FIGURE 5 is yet another modified form of the system of FIGURE 1;
FIGURE 6 is a schematic wiring diagram showing a current sensing relay which may be used in the warning system of the present invention;
FIGURE 7 is a modified form of the current sensing relay shown in FIGURE 6;
FIGURE 8 is another modified form of the current sensing system shown in FIGURE 6;
FIGURE 9 is a schematic wiring diagram which shows a current sensing relay including an adjustable magnetic pole piece; and
FIGURE 10 shows a construction of a differential relay which may be used in the warning system of the present invention.

It will be understood that like reference numerals throughout the various views of the drawings are intended to designate similar elements or components thereon.

Shown in FIGURE 1 is a warning system constructed in accordance with the principles of this invention and is designated generally by reference numeral 10. A battery 11 has one terminal thereof connected to ground potential, which may be the chassis of an automobile. The other terminal of the battery 11 is connected to the stationary contacts 12 and 13 of a main light switch 14 through a line 16.

A pair of coils 17 and 18 of an electromagnetic armature 19 are connected to stationary contacts 20 and 21 respectively. A pair of movable contactors 22 and 23 are provided to connect the stationary contacts 12, 20 and the stationary contacts 13, 21 respectively so as to apply power to certain ones of the lamps of the automobile.

The coil 17 is connected in series with a plurality of lamps 26, 27, 28 and 29. The lamp 26 is an indicator lamp located within the interior of the automobile to indicate that the main light switch is on. The indicator lamp 26 is often used to light the interior instrument panel of the automobile. The lamp 27 is a high beam headlight. The lamp 28 is a low beam headlight. The lamp 29 is a tail light.

The coil 18 is connected in series with a plurality of lamps 30, 31, 32 and 33 which are connected in parallel, as seen in FIGURE 1. The lamp 30 is a license plate light. The lamp 31 is a high beam headlight. The lamp 32 is a low beam headlight. The lamp 33 is a tail light. By way of example, the lamps 26–29 may be considered as being on the left side of the automobile, and the lamps 30–33 may be considered as being on the right side of the automobile.

As seen in FIGURE 1, the coils 17 and 18 are shown schematically as being wound in opposite directions. Therefore, the current passing through each of the coils 17 and 18 will provide equal and opposite magnetic fields when the light switch 14 is actuated closed. Should one or more of the lights on one side of the automobile burn out, there will exist an unbalance in the magnetic field produced by the relay armature 19 which is sufficient to close its normally open contact 36. The normally open contact 36 is connected in series with a buzzer 37 which, in turn, is connected to the power source 11 through the switch 14.

Also connected to the battery 11 is a movable contactor 38 of a turn directional switch 39. The movable contactor 38 has connected thereto a pair of stop lights 40 and 41. Connected in series between the stop lights 40 and 41 and the battery 11 is a coil 42 of a relay 43. The current delivered to the stop lights 40 and 41 passes through the coil 42 to develop a magnetic field thereby. The relay 43 has a second coil 44 which has one end thereof connected to the battery 11 through an ignition switch 46. The other end of the coil 44 is connected to a pair of stationary contacts 47 and 48 of the turn directional switch 39 through a flasher 49.

A pair of turn signal lights 50 and 51 are connected to terminals 52 and 53 respectively on the turn indicator switch 39. A stop light switch 56 is provided for applying power to the stop lights 40 and 41 through the coil 42 and the movable contactor 38. A normally closed contactor 57 is actuated by the relay coil 43 when current passes through either or both of the coils 42 and 44.

Should one of the brake lights 40 or 41 be inoperative the current flow through the coil 42 is decreased a substantial amount to cause the normally closed contactor 57 to remain closed and energize a buzzer 58. On the other hand, when the turn signal switch 39 is operated to energize the lamps 40 and 51, which by way of example may be located on one side of the automobile, current will flow through the coil 44 to produce a magnetic field therein to actuate the contactor 57. Also, when the turn signal switch 39 is actuated in the opposite sense, so as to energize the lamps 41 and 50 current will also flow through the coil 44 to product a magnetic field and actuate the contactor 57.

As the turn signal switch 39 is actuated in one or the other direction, the turn indicator lamps will be energized intermittently in accordance with the operation of the flasher 49. Therefore, each time the flasher 49 interrupts the current flow through the turn indicator lamps, the magnetic field produced by coil 44 will also be interrupted. This action will cause the normally closed contactor 57 to close and energize the buzzer 58. The audible signal generated by the buzzer 58 is sufficient to cause the operator of the motor vehicle to be aware that the turn indicator switch 39 is actuated. By providing an audible signal sufficiently loud of the operation of the turn signals on an automobile it will be appreciated that the operator will not forget that the turn signals are actuated, as is often the case during highway driving.

Shown in FIGURE 2 is a modified form of the warning system shown in FIGURE 1 and is designated generally by reference numeral 10a. The modification of the warning system shown in FIGURE 2 includes the addition of a coil 60 to the transformer 43. The coil 60 has one end thereof connected to a circuit point 61, which is connected to the battery 11 through the stop light switch 56. The other end of the coil 60 is connected to a circuit point 62. The coil 60 has many turns so as to provide a relatively high resistance in series with the turn indicator lights when the flasher 49 is in the open position. Therefore, should it be desired to eliminate the audible sound provided by buzzer 58 during the times when the flasher 49 is open, the coil 60 is provided to draw a minimum current which, however, is sufficient to produce a magnetic field to maintain the normally closed contact 57 in the open position. In this instance, the only audible signal would be that of the flasher 49.

The coil 17' of the transformer 19' is shown schematically as being wound in the same direction as the coil 18. The coil 17' is connected to a pair of lamps 63 and 64, which, in the illustrated embodiment, are headlights of an automobile. The coil 18 is connected to a plurality of lamps 66, 67, and 68 which are connected in parallel as seen in FIGURE 2. By way of example, the lamp 66 may be the taillight of an automobile, while the lamp 67 may be the license plate light, and the lamp 68 may be the other taillight.

In the system shown in FIGURE 2, the current through coil 17' is greater than the current through coil 18. Therefore, to provide a current sensing relay sufficiently sensitive to sense the failure of any one of the lights 63, 64, 66, 67, and 68, it is necessary to make the coils 17' and 18 different one from the other. The coil 18 has many turns of a predetermined wire gauge wound immediately adjacent the transformer core. Failure of any one of the lamps 66–68 will cause the magnetic field produced by the coil 18 to be reduced. The coil 17' has few turns of heavier gauge wire so as to produce a magnetic field as the result of the large current flow through the headlamps 63 and 64. Failure of either of the lamps 63 or 64 would decrease the current flow through the coil 17'. The magnetic field produced by the coils 17' and 18 are added together to actuate the contractor 36. However, should one of the lamps 63, 64, 66, 67, or 68 be defective, the magnetic field produced within the relay armature 19' will be decreased sufficiently to deactuate the contactor 36 which, in turn, will energize the buzzer 37.

Shown in FIGURE 3 is a modified form of the warning system constructed in accordance with the principles of this invention and is designated generally by reference numeral 10b. In the warning system shown in FIGURE 3, the coil 60 has been deleted from the transformer 43. However, a thermal switch 70 and a heating element 71 are connected in parallel and together are connected in series with the contactor 57 and buzzer 58. When the turn signal indicator switch 39 is actuated to energize the turn signal lamps, the normally open thermal switch 70 prevents the buzzer 58 from being energized when the turn signal indicator flasher 49 opens the circuit to the turn indicator lamps. However, when one of the brake lights are inoperative, the thermal switch 70 is rendered closed by the heater 71 to energize the buzzer 58.

Shown in FIGURE 4 is another modified form of the present invention and is designated generally by reference numeral 10c. As shown in FIGURE 4, the coil 60' of the transformer 43' has one end thereof connected to a circuit point 73. By connecting the coil 60' to the circuit point 73 rather than the circuit point 61 a continuous magnetic field is developed by the coil 60' thereby obviating the need of the flasher 70 and heating element 71, of FIGURE 3. When the turn signal indicator switch 39 is actuated, current will flow through the coil 44 during the time when the flasher 49 is electrically closed. However, when the flasher 49 is electrically opened current will pass through the coil 60' so as to maintain the contactor 57 in an opened position. Should one of the turn signal lamps fail while the turn signal indicator switch 39 is actuated, current through the coil 44 will be decreased sufficiently to cause the contactor 57 to close and energize the buzzer 58.

Also included in the modified arrangement 10c is a diode 74 which has the anode thereof connected to a circuit point 76 and the cathode thereof connected to a stationary contact 77 of an oil pressure switch 78. By adding the diode 74 in circuit between the oil pressure switch of the automobile and the circuit point 76, the warning system 10c can then be used to indicate to the operator of the motor vehicle that he has inadvertently left the lights turned on after he has opened the ignition switch 46. This feature of the present invention helps reduce the common error of leaving the lights of the automobile on during foggy or twilight conditions after the engine has been turned off.

A normally open contactor 80 is connected in parallel with a portion of the coil 18', and a normally closed contactor 81 is connected in series with the coil 18'. The contactors 36, 80 and 81 are associated with the relay armature 19" and actuated by the magnetic field therefrom. Therefore, the contactors 80 and 81 are provided to increase the sensitivity of the relay armature 19" when sensing the current flow through lamps 66, 67 and 68. The lamps 66–68 are relatively low current type lamps and therefore, it may be desirable to increase the sensitivity of the relay armature 19" to sense the relatively slight change in current flow therethrough should one of the lamps 66–68 burn out. By way of example, when the light switch is closed current will flow through the normally closed contactor 81, through the coil 18' and through the lamps 66–68. If all of the lamps 66–68 are in operating condition, the magnetic field produced by the two coils 17' and 18' will energize the relay armature 19" thereby opening the contactors 36 and 81 and closing the contactor 80. The contactor 80 by-passes a portion of the coil 18' thereby reducing the magnetic field produced by the coil, since it requires a lesser magnetic field to maintain the relay energized than it does to initiate energization thereof. When one of the lamps 66–68 becomes inoperative, the decreased magnetic field of the coil 18' is further decreased thereby deenergizing the relay 19".

Shown in FIGURE 5 is still another modified form of the present invention and is designated generally by reference numeral 10d. The modified form shown in FIGURE 5 is provided with an additional winding 83 which is shown schematically as being wound in the opposite direction as the coils 42 and 44. The coil 83 serves as a voltage regulator winding for the relay armature 43 of the warning system 10d. Also, a coil 84 is provided on the relay armature 19" and is shown schematically as being wound in the opposite direction as the coils 17' and 18'. The coil 84 serves as a voltage regulating element for the relay 19" of the warning system 10d. The voltage regulator windings 83 and 84 serve to maintain the magnetic field developed within the relay coils 43 and 19 at a substantially constant level independent of the voltage output of the automobile's generator, which in many instances, may vary between 12 and 14 volts.

Shown in FIGURE 6 is an illustrative embodiment of a differential relay circuit used in conjunction with the warning system of the present invention. A relay designated generally by reference numeral 90 has a movable contactor 91 pivotally connected to the relay 90 at a pivot point 92. A pair of stationary contacts 93 and 94 are mounted on an insulating block 96 by a screw 97. A pair of relay coils 99 and 100 are positioned on opposite sides of the pivotally mounted contactor 91, as seen in FIGURE 6. The coils 99 and 100 may be offset or displaced axially one from the other so as to have varying degrees of effect on the pivotal contactor 91. That is, should the current flow through the coil 99 be less than the current flow 100, it is desirable to move the magnetic field produced by the coil 99 further away from the pivot point 92 than is the magnetic field of the coil 100. This action will provide a balance between the magnetic fields sensed by the pivotal contactor 91 and maintain the contactor in a substantially neutral position, as seen in FIGURE 6. The coil 99 is connected in series with a lamp 101, while the coil 100 is connected in series with a lamp 102. The power source 11 is connected to a circuit point 103 intermediate the coils 99 and 100. When one of the lamps 101 or 102 becomes inoperative, either by an open circuit or by a short circuit, the magnetic field produced by the coils 99 and 100 becomes unbalanced thereby shifting the movable contactor 91 about its pivot point 92. The stationary contacts 93 and 94 and the contacts of the pivotal contactor 91 are then used to close a circuit to energize a warning signal to indicate one of the lamps 101 or 102 is inoperative.

Shown in FIGURE 7 is a modified form of the differential relay circuit shown in FIGURE 6. A coil 106 has a center tap 107, by way of example, at the mid-point thereof. Connected to one end of the coil 106 is a headlamp 108 and a tail lamp 109. Connected to the other end of the coil 106 is a headlamp 110 and a tail lamp 111. A pair of movable contactors 113 and 114 are actuated by the coil 106. The movable contactor 113 is connected in series with a buzzer 116. The movable contactor 114 is connected in series with a buzzer 117. The total current flow through the lamps 108 and 109 is equal to the total current flow through the lamps 110 and 111, and the magnetic field produced by the coil 106 is such as not to actuate the contactors 113 and 114. However, should one of he lamps 108–111 become inoperative, the current flow through the coil 106 will be off-balance thereby producing a magnetic field sufficient to actuate one of the contactors 113 and 114 and energize the respective one of the buzzers 116 and 117. It will be understood that the total current flow through the lamps 108 and 109 does not necessarily have to be equal to the total current flow through the lamps 110 and 111. The tap 107 of the coil 106 can be moved to an appropriate position on the coil 106 so as to compensate for any variation in current flow between the respective branches thereof.

Shown in FIGURE 8 is another illustrative embodiment of the warning system which is constructed in accordance with the principles of this invention. The battery 11 is connected to a main light switch 120 of an automobile and to an ignition switch 121. When the main light switch 120 is closed, current will flow to the circuit point 122 whereupon it is divided and delivered to two separate circuits through lines 123 and 124. The line 123 is connected to a plurality of lamps 126, 127, 128, 129, 130 and 131. The line 124 is connected to a plurality of lamps 32, 33, 34, 35, 36 and 37. The lamps 126–129 are connected in parallel, while the lamps 130 and 131 are connected to stationary contacts 140 and 141 respectively of a switch 142. The lamps 134–137 are connected in parallel, while the lamps 132 and 133 are connected to stationary contacts 143 and 144 respectively of a switch 146. The switches 142 and 146 are directional indicator switches. Furthermore, it will be understood that any one of the lamps 126–137 may represent in itself one or more lamps.

Current flow from the battery 11 to the lamps 126–131 passes through a coil 150. Similarly, current flow from the battery 11 to the lamps 132–137 passes through a coil 151. By way of illustrative example, the coils 150 and 151 have substantially the same number of turns of the same gauge wire to provide substantially equal and opposite electromagnetic fields thereby. In this instance, it will be understood that the total current flow through the lamps 126–131 is equal to the total current flow through the lamps 132–137. Therefore, should one of the lamps 126–137 become inoperative, either open or short, an unbalance will exist between the magnetic fields produced by the coils 150 and 151 thereby actuating a contactor 152 to energize a buzzer 153.

Connected in series with the contactor 152 and buzzer 153 is a normally closed contactor 154 of an automatic reset switch 156. The reset switch 156 has a normally open contactor 157 which is selectably engageable with stationary contacts 158 and 159. When one or more of the lamps 126–137 becomes inoperative thereby creating an unbalance between the magnetic fields produced by the coils 150 and 151, the buzzer 153 will produce an audible sound.

It may be desirable to disable the audible sound generated by the buzzer 153 as not to annoy the operator of a motor vehicle for a prolonged period of time. Therefore, the automatic reset switch 156 is provided. The switch 156 is actuated to open the contactor 154 and close the contactor 157. This action will energize an electromagnetic coil 160. The magnetic field produced by the coil 160 is then sensed by a ferrous actuating rod 161 which, in turn, is held in abutting relation with a core 162 associated with the coil 160.

When the automobile ignition switch 21 is opened, the magnetic field produced by the coil 160 disappears and a spring 163 places the reset switch 156 in the position shown in FIGURE 8. Therefore, when the automobile is placed in operation at a later time, the contactor 154 will again cause the buzzer 153 to be energized in the event that the defective light has not been replaced.

A brake switch 166 is connected to the movable contactors of the switches 142 and 146. Stationary contacts 167 and 168 are connected through lines 170 and 171 to a flasher 172. When the switches 142 and 146 are in the position shown by the solid line, current will flow through the brake lights 131 and 132 through the brake switch 166. However, when the switches 142 and 146 are placed in the position shown by the dotted lines, current will flow through the turn indicator lamps 130 and 133 through the stationary contacts 140, 167 and 144, 168, respectively, and through the flasher 172. Therefore, the lamps 130 and 133 will be alternately energized and deenergized in accordance with the operation of the flasher 172.

Shown in FIGURE 9 is a modified form of an electromagnetic relay which may be used in the warning system of the present invention. A relay 175 has a coil 176 wound about an armature 177. A deflectable contactor 178 is secured to a frame member 179. Also, a deflectable contactor 180 is secured to the frame member 179. By way of example, the frame member 179 may be of insulating material. Immediately adjacent the electrical contacts 178a and 180a, and on the opposite side of the electromagnetic coil 176, is an adjustable permanent magnet 181 selectively positioned by a screw 182. As mentioned hereinabove, the contactors 178 and 180 are deflectable in accordance with the strength of the magnetic field produced between the electromagnetic coil and the permanent magnet 181.

By way of example, during the normal operation of the relay shown in FIGURE 9, the deflectable contactor 178 may be shifted toward the coil 176 by the magnetic field produced therein. The magnetic field produced by the permanent magnet 181 is sufficient to deflect the contactor 180 toward the magnet 181. However, should one of the lamps 183 or 184 fail to operate properly, by either opening or closing the contacts 178a and 180a will engage thereby closing a suitable circuit to energize an audible signal system. Should the lamp 183 burn out, the current flow through the coil 176 is decreased to cause the permanent magnet 181 to attract the deflectable contactor 178 and close the contacts 178a and 180a. However, should the lamp 183 become short circuited increased current flow through the coil 178 will cause the magnetic field produced thereby to increase a proportional amount and attract the movable contactor 180 to engage the contacts 178a and 180a.

The relay and circuit arrangement of FIGURE 9 may be modified by replacing the permanent magnet 181 with a ferrous metal bar so as to absorb some of the magnetic field produced by the electromagnetic coil 176.

Shown in FIGURE 10 is the detailed construction of a relay in accordance with the principles of this invention and designated generally by reference numeral 190. The relay 190 has a movable contactor 191 which is carried by an actuating arm 192. A stationary contact 193 is secured to a bracket 194. The bracket 194 is fastened to a base 196 of the relay 190 by a screw 197. The bracket 194 is electrically separated from the base 196 by an insulator block 198. The movable actuator 192 has an offset portion 199 and a straightaway portion 200. A biasing spring 201 is connected between the offset portion 199 and a tab 202 to urge the actuator 192 upwardly and maintain the contacts 191 and 193 in the closed position.

The relay 190 has an armature 204 connected to the base 196. The armature 204 may comprise two or more coils, for example, such as the coils 42 and 44 of the relay 43 shown in FIGURE 1. Each of the coils of the armature 204 has a pair of output terminals 206, 207, 208 and 209. The output terminals 206 and 207 may be associated with the outer coil, while the terminals 208 and 209 may be associated with the inner coil. The coils of the armature 204 may be wound in such a manner as to provide adding or subtracting magnetic fields as desired. Also, it will be understood that the armature 204 may include a voltage regulator winding. Furthermore, an electromagnet armature having reed switches in proximity therewith may be used in place of the relay 190.

Although the warning system of this invention is shown having particular utility when used in conjunction with an automobile, it is not to be construed in a limiting sense. Therefore, it will be understood that variations and modifications may be effected without departing from the spirit and scope of the novel concepts of this invention.

We claim as our invention:

1. An electrical circuit of a vehicle having a power source which is connected to a first group of lamps through a main light switch, and further connected to a second group of lamps through an ignition switch connected in series with a flasher and a turn indicator switch and having a stop light switch connected between the power source and certain ones of the second group of lamps so as to energize said certain ones of the lamps to indicate stopping of the vehicle, the improvement therewith including:

a first coil electrically connected in series with a predetermined number of lamps of the first group of lamps to have a predetermined current flow therethrough to cause a first magnetic field when the main light switch is closed;

a second coil electrically connected in series with the remaining number of lamps of the first group of lamps to have a predetermined current flow therethrough to cause a second magnetic field when the main switch is closed;

a first core for receiving said first and second coils to be wound thereon to develop a common magnetic field from said first and second magnetic fields;

first switch means actuated by said common magnetic field of said first core;
a warning device connected to the power source of the vehicle and energizable by said first switch means;
a third coil electrically connected in series with the certain ones of the second group of lamps to have a current flow therethrough to cause a third magnetic field when the turn signal switch is actuated in one of two directions;
a fourth coil electrically connected in series with the second group of lamps to have a current flow therethrough to cause a fourth magnetic field when the stop light switch is closed; and
a second core for receiving said third and fourth coils to be wound thereon to develop a common magnetic field from the third and fourth magnetic fields;
second switch means actuated by the common magnetic field of said second core.

2. A warning system including: a power source; power utilization means divided into first and second groups for receiving current from respective first and second current paths including, a first predetermined number of lamps electrically connected in parallel to form said first group of power utilization means having a predetermined total current flow, and a second predetermined number of lamps electrically connected in parallel to form said second group of power utilization means having substantially the same current flow as said first predetermined number of lamps; current sensing means connected to said power source and each of said power utilization means to sense current flow through each of said power utilization means; switch means located in proximity with said current sensing means to be actuated thereby in response to current flow through said current sensing means; a warning device electrically connected between said power source and said switch means to energize said switch means in response to a change in current flow through said current sensing means; a coil connected in series between said first and second predetermined number of lamps; circuit means connecting a tap on said coil to said power source thereby passing current through said coil in respective first and second paths and first and second magnetizable switch means carried in proximity with said coil so as to be actuated by respective first and second current paths through said coil.

3. The system of claim 2 in which said warning device provides an audible signal.

4. The system of claim 2 including timing means connected in series with said second switch means to cause said second warning device to remain deenergized during periods when the turn signal switch is operated simultaneously with the brake switch.

5. The warning system of claim 2 including:
a fifth coil wound on said second core to provide a magnetic field sufficient to maintain said second switch means actuated during simultaneous operation of the turn signals and brake lights of the motor vehicle.

6. The warning system of claim 2 including:
a fifth coil wound on said second core to provide a magnetic field sufficient to maintain said second switch means actuated when the turn signal flasher is electrically opened.

7. The warning system of claim 2 including:
a fifth coil wound on said first core to produce a magnetic field in the opposite sense as said first and second coils;
a sixth coil wound on said second core to produce a magnetic field in the opposite sense as said third and fourth coils;
said fifth and sixth coils serving as voltage regulating means.

8. The warning system of claim 2 further including:
an automatically resettable cut-out switch which can be actuated to disable said warning device during the operation of the warning system during a first instance and which is automatically reset when the warning device is operated during a second instance.

9. The warning system of claim 2 further including:
an automatically resettable cut-out switch which can be actuated to disable said warning device during the operation thereof during a first instance and which is automatically reset before the operation thereof during a second instance.

10. The warning system of claim 2 further including:
an automatically resettable cut-out switch consisting of:
a magnetizable actuator which is moved upon actuation thereof; and
an electromagnet energizable from the power source when the cut-out switch is actuated by said magnetizable actuator to hold the cut-out switch continuously actuated during the operation of the warning system.

References Cited
UNITED STATES PATENTS

| | | | |
|---|---|---|---|
| 2,285,544 | 6/1942 | Trogan | 340—251 |
| 2,820,215 | 1/1958 | Hughes | 340—52 XR |
| 3,143,729 | 8/1964 | Power | 340—251 XR |
| 3,250,950 | 5/1966 | Reiche | 340—80 XR |

JOHN W. CALDWELL, *Primary Examiner.*

ALVIN H. WARING, *Assistant Examiner.*

U.S. Cl. X.R.

315—77, 130; 317—155.5; 340—251, 253